Figure 1:
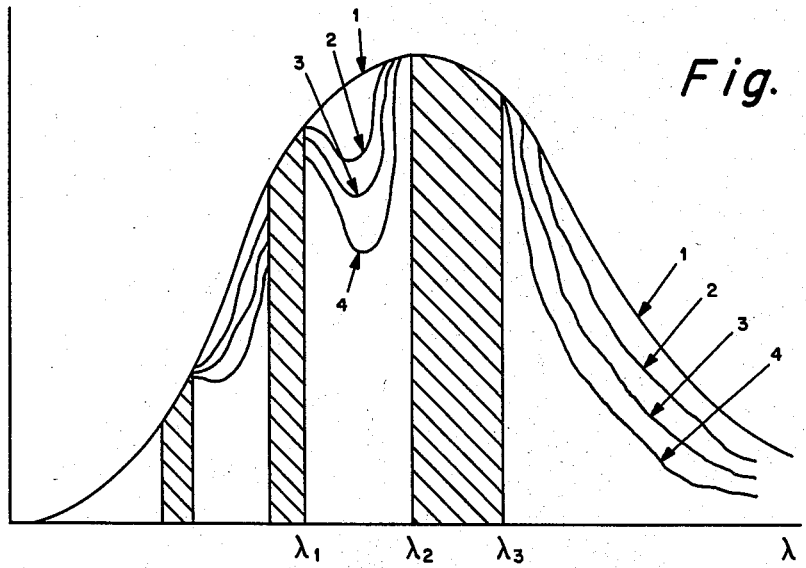

Jan. 7, 1964   J. R. JENNESS, JR., ETAL   3,117,228
APPARATUS FOR PASSIVE INFRARED RANGE FINDING
Filed Oct. 12, 1956   4 Sheets-Sheet 1

INVENTORS
FRANK J. SHIMUKONIS
JAMES R. JENNESS, JR.
BY
ATTORNEYS

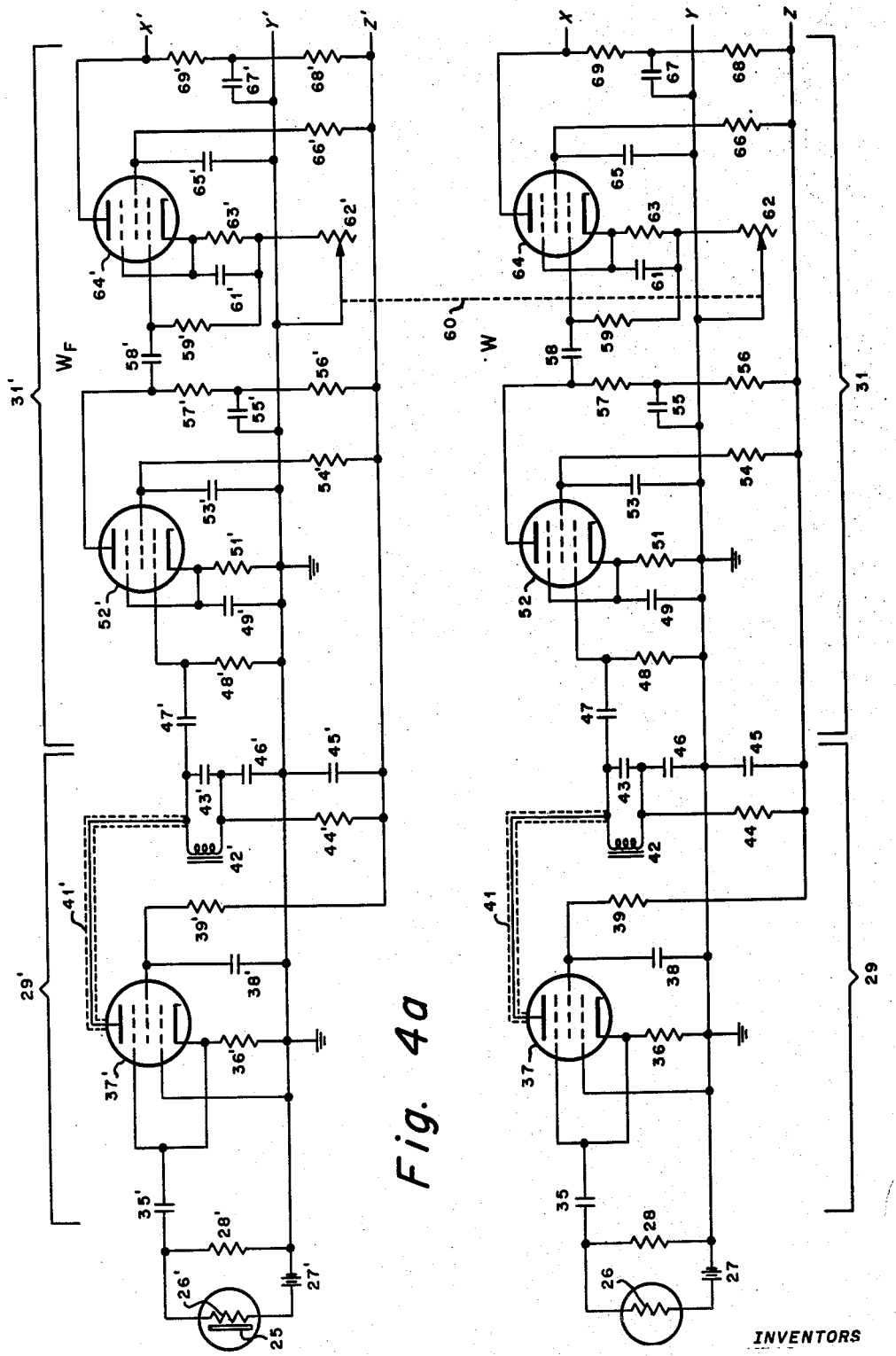

Jan. 7, 1964     J. R. JENNESS, JR., ETAL     3,117,228
APPARATUS FOR PASSIVE INFRARED RANGE FINDING
Filed Oct. 12, 1956                                4 Sheets-Sheet 4
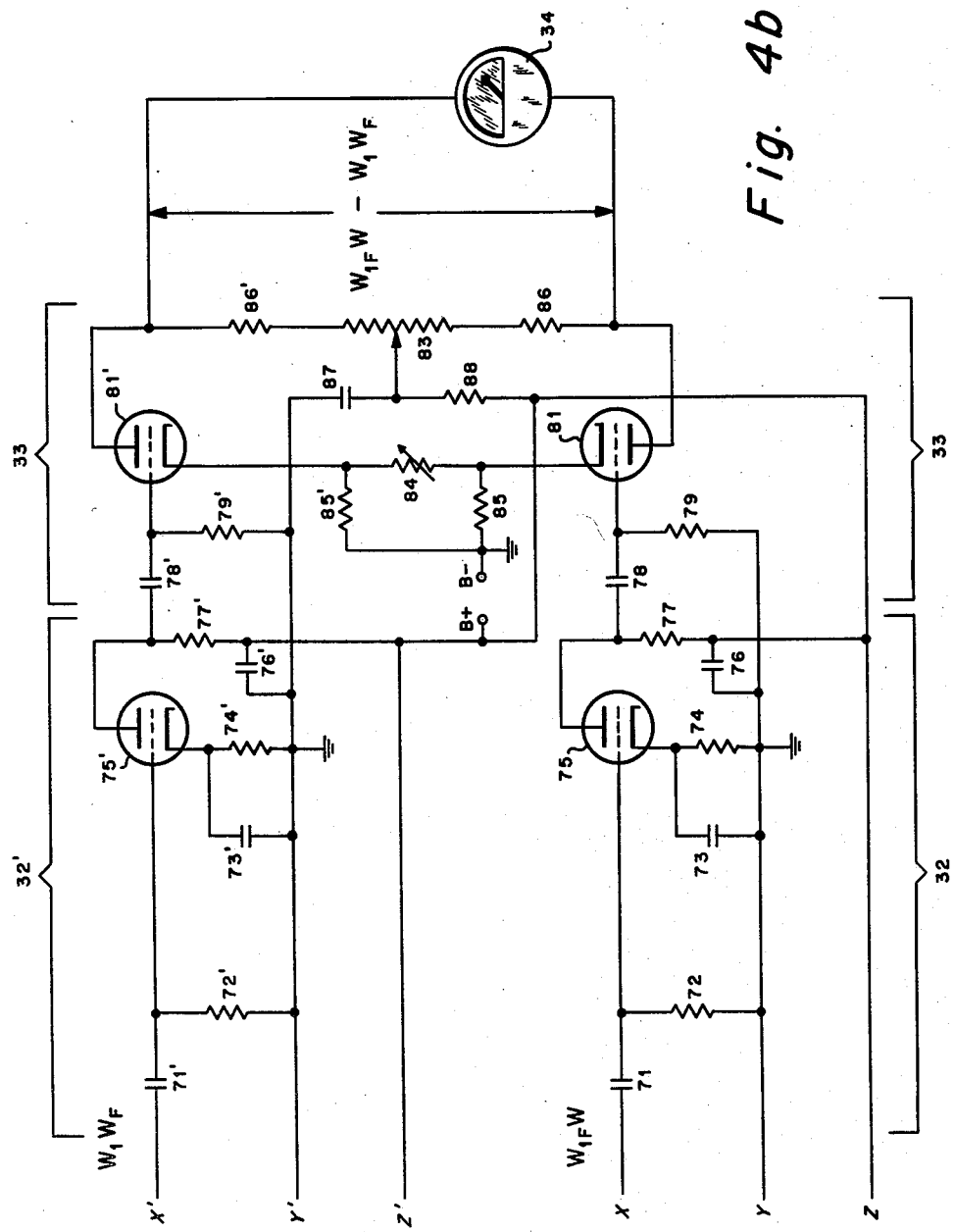
Fig. 4b
*INVENTORS*
FRANK J. SHIMUKONIS
JAMES R. JENNESS, JR.
BY
*ATTORNEYS*

United States Patent Office 3,117,228
Patented Jan. 7, 1964

3,117,228
APPARATUS FOR PASSIVE INFRARED
RANGE FINDING
James R. Jenness, Jr., R.D. 1, Sunset Road, Lot 12, State
College, Pa., and Frank J. Shimukonis, 3 Round
Meadow Lane, Hatboro, Pa.
Filed Oct. 12, 1956, Ser. No. 615,726
3 Claims. (Cl. 250—83.3)
(Granted under Title 35, U.S. Code (1952), sec. 266)

The invention described herein may be manufactured and used by and for the Government of the United States of America for governmental purposes without the payment of any royalties thereon or therefor.

The present invention relates to an apparatus for range finding and more particularly to an apparatus for passive infrared range finding in air-to-air applications wherein advantage is taken of the discovery that there is preferential absorption of infrared radiation by the atmosphere in some spectral bands more than in other spectral bands.

Present range finding techniques include the use of radar, pulsed infrared sources and processes of triangulation. Triangulation is not practical for long range determination in air-to-air applications by a single aircraft since no base line of sufficient length necessary for acceptable range accuracy is possible. Radar, although an effective means of ranging, has the undesired characteristic due to its non-passive nature of being readily detected by others, and therefore, this means of ranging is susceptible to jamming. Pulsed infrared methods are unsuitable for long ranges and provide the further disability in that they can be detected by others. The instant invention though limited in its capability to determine ranges with the precision obtainable by radar or pulsed infrared techniques, overcomes the principal deficiencies noted above since the inventive embodiment incorporates a passive means of infrared range finding.

The inventive principle utilized in the instant embodiment is based upon a discovery that there is preferential absorption of the infrared radiation by the atmosphere in some spectral bands more than in other spectral bands. The ratio of the intensity of the infrared radiation received in each spectral band varies directly with the character of the infrared source, and exponentially as to the product of distance and the difference of the atmospheric attenuation coefficients for the respective spectral bands. The inventive embodiment, in accordance with these principles, provides structure which make a comparison of the radiation received in each of these spectral bands from an aircraft having known thermal intensity characteristics and converts the resultant of the compared signals into an indication of range. Calibration means are provided which take into account both the radiation of hot bodies of differing thermal intensity characteristics and also the atmospheric attenuation coefficients for the atmospheric operating conditions contemplated. Thus, the inventive apparatus provides an indication of range by completely passive infrared detecting means which are not subject to detection in the manner as indicated above.

This application is a continuation-in-part of application Serial No. 397,276, filed December 9, 1953, for a Method for Passive Infrared Range Finding, now abandoned.

Accordingly, an important purpose of the instant invention is to determine the range of an infrared radiating target whose thermal intensity characteristics are known using completely passive means from a single observation station.

Another aim is to utilize the effect of hot objects emitting radiation of predetermined intensity and wavelength described by the Stephen-Boltzmann, Planck, and Wein radiation laws by detecting the radiation from those hot objects and utilizing the property of selective atmospheric attenuation for determining the distance of the hot object.

Another aim of the invention is to present a passive type of apparatus which cannot itself be readily detected and which presents relatively long range means to detect the range of a target.

Another aim of the invention is to present a spectral discrimination apparatus which is capable of detecting the range of a target passively and at a maximum distance for the type of radiation emitted by the target.

Other objects and many of the attendant advantages of this invention will be readily appreciated as same becomes better understood by reference to the following detailed description when considered in connection with the accompanying drawings wherein:

FIG. 1 presents a graphical representation of intensity of infrared radiation for a family of curves representing given distances from a hot body as plotted against wavelength showing selective attenuation of bands of wave lengths in accordance with the principles taught in the method and apparatus of the instant invention.

Figure 2:
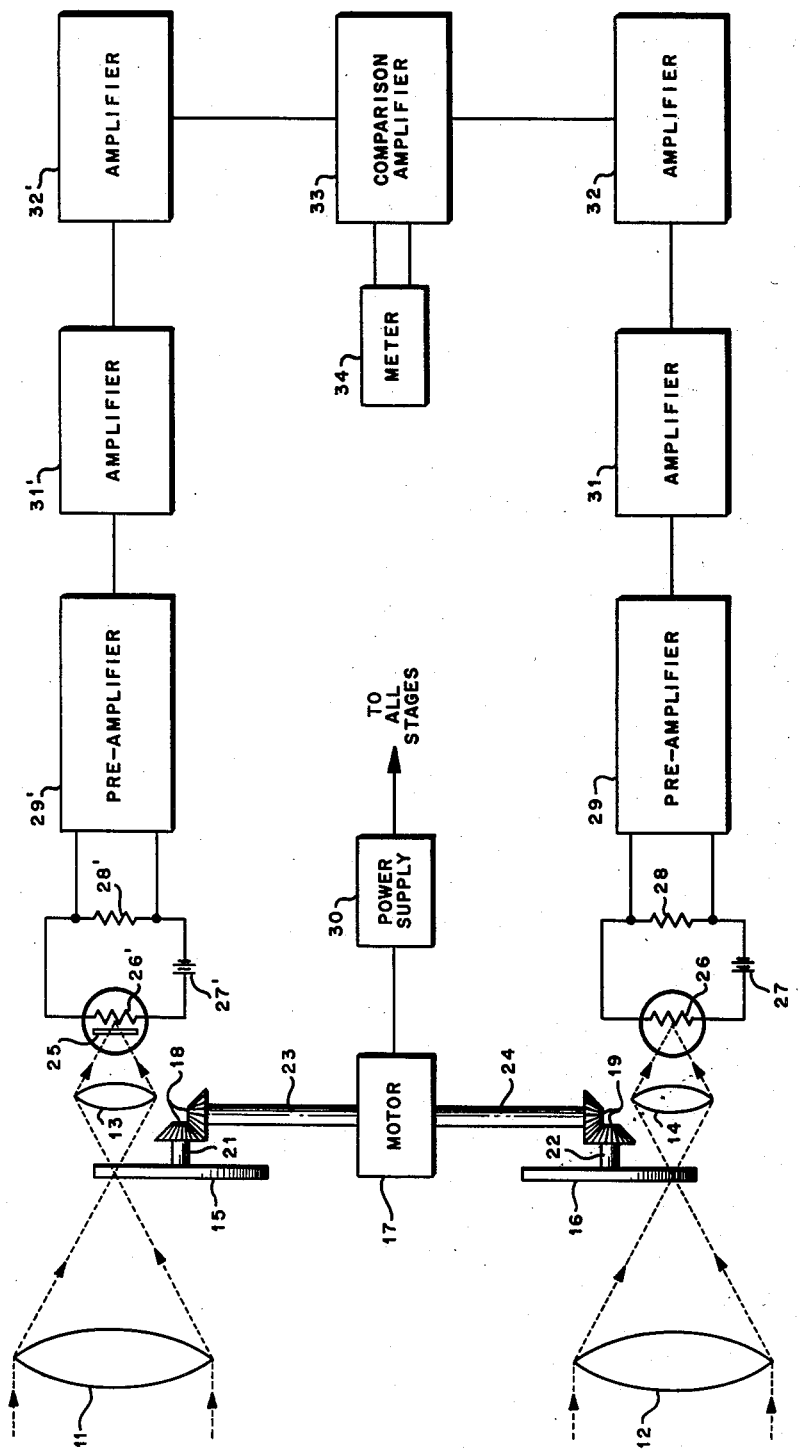

FIG. 2 shows a simplified block diagram of a preferred form of apparatus utilizing the principles of the instant invention.

Figure 3:
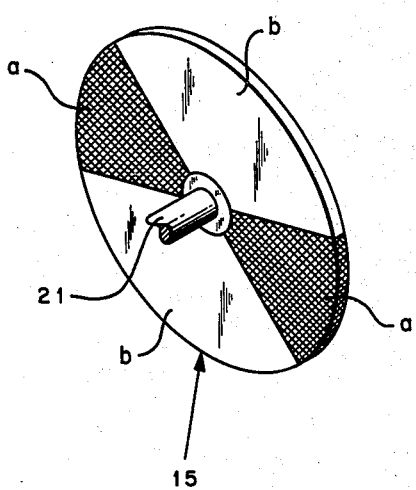

FIG. 3 shows a detailed isometric representation of a synchronous chopper utilized in the preferred embodiment to interrupt the rays of infrared radiation, and, FIGS. 4a and 4b are detailed schematic diagrams showing components of the electrical circuit necessary for implementing the principles of the instant invention and should be understood as joined together at points W, X, Y and W', X' and Y' to form a composite schematic diagram of the electrical circuit of the inventive embodiment.

A hot object such as an aircraft or other target will emit radiation of intensity and wavelength described by the Stephen-Boltzmann, Planck and Wein radiation laws. The intensity of this radiation decreases as the distance from the radiating body is increased. This is due to two effects:

(1) As the radiation travels in all directions from its source, its intensity at a given distance from the source is inversely proportional to the square of the distance from the source.

(2) The radiation is attenuated exponentially through scattering by particles in colloidal suspension in the atmosphere and absorption by gaseous components of the atmosphere.

These phenomena can be indicated mathematically by the expression (1) $$W = \frac{W_1}{r^2} \cdot e^{-\alpha(r-1)}$$

Where:

$W$ = intensity of radiation at any distance from radiating body
$W_1$ = intensity of radiation at unit distance from radiating body
$r$ = distance from radiating body
$\alpha$ = atmospheric attenuation coefficient
$e$ = base of Naperian logarithms The inverse square effect acts equally on radiation of all wavelengths, but it is of importance to note that the coefficient has greater values for some wavelengths than for others.

Multiplying both sides of the above equation by $r^2$, the following expression results:

(2) $$Wr^2 = W_1 \cdot e^{-\alpha(r-1)}$$

The quantity $Wr^2$ when plotted as a function of wavelength $\lambda$, shows the effect of atmospheric attenuation on radiation at different spectral distribution. In FIG. 1, curve 1 is taken at a very small value of $r$, and since the distance of transmission through the atmosphere is negligible, this curve shows the spectral distribution of radiation received in its entirety. Curves 2, 3 and 4 are taken at increasing values of $r$, and shows that in some spectral bands there is comparatively small attenuation, with greater attenuation in other bands.

Referring further to FIG. 1, consider two adjacent spectral bands, one from $\lambda_1$ to $\lambda_2$, the second from $\lambda_2$ to $\lambda_3$. The band from $\lambda_1$ to $\lambda_2$ in accordance with the curves shown in FIG. 1 has greater attenuation than the band from $\lambda_2$ to $\lambda_3$. The intensity received using each band can be represented by, $$(3) \qquad W_A = \frac{W_{1A}}{r^2} \cdot e^{-\alpha_A (r-1)}$$

$$(4) \qquad W_B = \frac{W_{1B}}{r^2} \cdot e^{-\alpha_B (r-1)}$$

Where:

$W_A$ = intensity of radiation between wavelengths $\lambda_1$ and $\lambda_2$
$W_B$ = intensity of radiation between wavelengths $\lambda_2$ and $\lambda_3$
$W_{1A}$ = intensity of radiation at unit distance from radiating body between wavelengths $\lambda_1$ and $\lambda_2$
$W_{1B}$ = intensity of radiation at unit distance from radiating body between wavelengths $\lambda_2$ and $\lambda_3$
$\alpha_A$ = effective atmospheric attenuation coefficient for radiation between wavelengths $\lambda_1$ and $\lambda_2$
$\alpha_B$ = effective atmospheric attenuation coefficient for radiation between wavelengths $\lambda_2$ and $\lambda_3$ Dividing the first of these equations by the second gives:

$$(5) \qquad \frac{W_A}{W_B} = \frac{W_{1A}}{W_{1B}} \cdot e^{(\alpha_B - \alpha_A)(r-1)}$$

from which is derived:

$$(6) \qquad r = \frac{1}{\alpha_B - \alpha_A} \log_e \frac{W_A W_{1B}}{W_B W_{1A}} + 1$$

This expression gives a value for $r$ or distance in terms of ascertainable or measurable quantities.

Consider a target which is emitting detectable infrared radiation from which it is desired to find the range of the target. By means of a suitable transmission filter of the reflection interference type, the spectral bands which have small values of $\alpha$ (shown shaded in FIG. 1) can be separated from the total radiation, and all the radiation available in these bands can be focused onto an infrared detector. The total available radiation can be focused, unfiltered, on another infrared detector.

By a derivation similar to that of the previous equation, the following expression is obtained:

$$(7) \qquad r = \frac{1}{\alpha_F - \alpha} \log_e \frac{W W_{1F}}{W_F W_1} + 1$$

Where:

$W$ = intensity of total radiation
$W_F$ = intensity of filtered radiation
$W_1$ = intensity of total radiation at unit distance from target
$W_{1F}$ = intensity of filtered radiation at unit distance from target
$\alpha$ = effective atmospheric attenuation coefficient for total radiation
$\alpha_F$ = effective atmospheric attenuation coefficient for filtered radiation From the above equation, it becomes apparent that if a physical system can be supplied for making a comparison between the signals representing the filtered and unfiltered radiation, the range of an infrared radiating target may be determined by operating on the signal resulting from such a comparison since range is inversely proportional to the resultant difference of the compared signals. The quantities $W$ and $W_F$, the total radiation intensity and the filtered radiation intensity, respectively, are derived directly from received signals. The thermal intensity coefficients $W_{1F}$ and $W_1$, the intensity of the filtered radiation at unit distance from the target and the intensity of total radiation at unit distance from the target, respectively, depend upon the effective black body temperature of the target. Therefore, the above coefficients, which may be expressed as the thermal intensity ratio $$\frac{W_{1F}}{W_1}$$

are a function of the particular type of aircraft being viewed, and the limit value of this ratio will depend on whether the infrared radiation being received is from a small thermally radiating object such as a single engined piston type aircraft or from a large thermally radiating object such as a multi-engined jet aircraft. Thus, the ratio $$\frac{W_{1F}}{W_1}$$

is initially obtained from flight calibration data in which the thermal energy characteristics of a particular aircraft are ascertained as a function of known standard ranges. $\alpha$, the effective atmospheric attenuation coefficient for a total radiation, and $\alpha_F$, the effective atmospheric attenuation coefficient for filtered radiation may likewise be obtained from atmospheric infrared transmission data and correlated with calibration flights. The quantity $$\frac{1}{\alpha_F - \alpha}$$

in which the atmospheric attenuation coefficients appear may be treated as a constant K for a given altitude, and its effect in the equation tending to reduce the effective range of the inventive ranging system is least significant at high altitudes, where the density of gaseous and vaporous components in the atmosphere is very considerably reduced. This constant is calibrated by a suitable calibration means which is initially preset in accordance with contemplated flight operating conditions.

The physical realization of the above indicated Equation 7 is presented in FIG. 2, in which a simplified block diagram of the instant infrared ranging system is illustrated. A representative telescopic system of an elementary type is shown to collect the rays of infrared radiation impinging upon a pair of collimating lenses 11 and 12 which define the field of view for the system. At the focal axes of the respective lenses 11 and 12 are located a pair of synchronous discs 15 and 16 which serve as choppers to interrupt in unison the rays of radiation convergent upon the foci. The synchronous discs are shown driven by a motor 17 the rotation of which is concurrently transmitted to the respective discs 15 and 16 by the appropriate drive shafts 23 and 24, bevel gears 18 and 19, and drive members 21 and 22, fixedly secured to the respective discs. Variation in speed of motor 17 is unimportant, but it is essential that the discs be in synchronism. FIG. 3 shows in detail an isometric representation of a single disc 15 of the instant embodiment, both discs being structurally and functionally identical. The face of disc 15 is shown to be symmetrically divided into opaque and transparent sectors designated by lower case alphabetical letters $a$ and $b$, respectively. In the instant embodiment, the opaque sectors have been chosen to be approximately one-half the area of the transparent sectors so that for a single revolution of the disc, the length of time during which the field of view is scanned is approximately twice the duration of the interrupted or opaque portion. The ratio of opaque to transparent areas, however, is arbitrary and may be whatever design considerations dictate. Referring again to FIG. 2, the synchronously interrupted rays of infrared radiation incident upon converging lenses 13 and 14, are brought to a focus upon photoconductive cells 26 and 26' located at the focal points of the respective lenses. The photoconductive cells are of a type which have the property of decreasing in electrical resistance when exposed to radiant energy of short wavelengths. The sensitive coating of these cells are of a material such as lead sulphide lead telluride, lead selenide or the like, for which a maximum response to radiant energy stimulus is obtained in particular wavelengths. Lead sulphide, for example, has a maximum response within the wavelength range of .8 to 3 microns.

The optical system of the embodiment shown in FIG. 2 incorporates a transmission filter 25 of the reflection interference type having cut-off or band-pass characteristics which permit only those spectral bands to be received by the photoconductive cell 26' which are shown shaded in FIG. 1. Reflection interference filters requiring particular band-pass characteristics can be specially constructed according to the known practice in the art. In general, these interference filters are produced by vacuum evaporation of alternate films of germanium and sodium aluminum fluoride onto microscope cover glass. Once, the relative thicknesses of the film and the film materials are specified, the characteristic cut-off and pass band of the filter will occur in wavelengths which are determined by the actual film thicknesses. The filter 25 employed in the instant invention is of the type utilizing these principles of construction and is fully described in a report made by the Bausch & Lomb Optical Co. of Rochester, New York, in conjunction with the Proceedings of the Conference on Infrared Optical Materials, Filters and Films, held Feb. 10, 1955, at the Engineer Research and Development Laboratories, Fort Belvoir, Virginia. This report is incorporated in a publication issued by the Department of the Army Corps of Engineers, Fort Belvoir, Virginia, pages 123 through 127 of this publication illustrate typical transmission pass band curves for various filters, applicable to the infrared ranging device of the instant invention.

Apart from the optical means shown in FIG. 2, dual channel signal channels are provided as illustrated in block diagram form for implementing the inventive principles for ultimate range determination. As depicted in FIG. 2, the lower channel is observed to contain a sensitive photoconductive cell 26 appropriately series connected with voltage source 27 and load resistor 28. Pre-amplifier 29 is of a conventional grounded grid type and is connected in the input to receive the signal voltage developed across the load resistor. Amplifier 31 is a conventional two stage voltage amplifier the output of which is impressed onto the input circuit of a conventional amplifier 32. Up to this point, it should be observed that the elements designated by prime numbers in the upper channel are identical as to structural characteristics and function with those of the corresponding elements of the lower channel. Thus, in the output circuits of amplifier 32 and 32', respectively, appear signal voltages which are impressed upon a comparison amplifier 33. A difference between the two applied signal voltages is obtained in stage 33, the resultant output voltage appearing across a root-mean-square type of voltmeter, which is calibrated to indicate range on a suitable indicating means 34. Power supply 30 provides the required excitation for motor 17, and also supplies the heater requirements of the instant embodiment. A conventional electronically regulated rectifier is contained in this power supply furnishing the D.-C. potential required for all stages.

FIGS. 4a and 4b show in greater detail the electrical components comprising the elements of the instant embodiment as illustrated in FIG. 2. Inasmuch as the dual channel circuits depicted therein are essentially replicas of each other, the description will be directed to the lower channel, and it should be understood that the elements of the upper channel having like numbers with exception of the prime notations, are identical in function with those of the lower channel. Pre-amplifier 29 is a class A amplifier comprising a pentode, tube 37, in a grounded grid amplifier circuit. Cathode resistor 36 provides proper operating bias, and also constitutes with coupling capacitors 35, the input load for this stage. The RC time constant of capacitor 35 and resistor 36 are such that no capacitive differentiation occurs, or more precisely $$RC \gg \frac{1}{f}$$

where $$\frac{1}{f}$$

is the period of the chopping or interruption of the incident infrared radiation being received. A portion of the signal path in the plate circuit of tube 37 is shown shielded with the aid of shielded conductor 41, since in actual practice the pre-amplifier stage will usually be located nearest the photoconductive cell 26, well removed from the input circuit of amplifier 31. Inductance 42 and capacitor 43 form a broadly resonant plate load which is resistance-capacitance coupled to the succeeding stage by grid resistor 48 and coupling condenser 47. Resistor 39 as well as resistors 54 and 66 of pentodes 52 and 64, respectively, provide for correct screen operating potential. Capacitors 38, 53, and 65 comprise screen bypass capacitors, presenting a low impedance to the alternating components of signal voltage. Capacitor 45 is a large filter condenser connected across the D.C. input terminals for the maintenance of a constant potential at these terminals. A decoupling filter is provided in capacitor 46 and resistor 44, while the respective capacitive-resistive combinations 55 and 56, 67 and 68 perform a similar function for the respective pentodes, 52 and 64. Amplifier 31 is shown to employ pentodes 52 and 64 which are cathode biased with appropriate resistors 51 and 63, and bypassed to preclude degeneration with capacitors 49 and 61, respectively. Resistors 57 and 69 comprise the plate load resistances for the respective tubes 52 and 64. Resistive-capacitive coupling between the stages of amplifier 31 is provided by coupling condenser 58 and grid resistor 59. Variable resistances 62 and 62' in the respective circuits are degenerative feedback controls whose shafts are mechanically ganged as indicated by the dotted line notation 60 which schematically represents an adjustable calibration control which is effective to modify the gain of stages 64 and 64' as required in accordance with the different levels of the thermal intensity ratio $$\frac{W_{1F}}{W_1}$$

The adjustment of the calibration control 60 is made in conjunction with predetermined flight calibration data, as previously discussed in connection with the equation for determination of range.

Stage 32 comprises a conventional voltage amplifier, utilizing a triode which is cathode biased with resistor 74 and bypassed with capacitor 73. The signal voltage of the preceding stage is RC coupled with the aid of capacitor 71 and grid load resistor 72. Resistor 77 is a plate load resistor across which is developed the amplified voltage of the grid to cathode potential, capacitor 76 being a plate bypass. Amplifier 32 is RC coupled to the succeeding stage by capacitance 78 and grid resistance 79.

Stage 33 comprises a comparison amplifier which is basically a difference amplifier having a modified cathode circuit. This stage is connected to both the upper and the lower channels and functions to produce a resultant of the signal voltages impressed upon the respective grid circuits of triodes 81 and 81'. Thus, meter 34, which has a relatively high internal resistance, is connected across symmetrical plate loads 86 and 86' to give an indication of the output difference voltage, indicative of range to a target which is emitting infrared radiation. The common T connected cathode resistance of a conventional difference amplifier has been modified in the instant embodiment by a pi connected equivalent consisting of fixed resistances 85, 85' and a relatively small variable resistance 84, the atmospheric attenuation calibration control. This control is preset in accordance with the constant $$K = \frac{1}{\alpha_F - \alpha}$$

to effectively modify the gain of the difference amplifier by degenerative feedback. The adjustment of this control is made in conjunction with predetermined atmospheric transmission data as previously discussed in connection with the equation for the determination of range, for the contemplated flight operating conditions of a particular flight. Potentiometer 83 is a relatively small resistance used for the purpose of equalizing the plate currents of triodes 81 and 81'. A decoupling filter is provided by capacitor 87 and resistor 88. It should be noted that the T connected equivalent of the indicated pi cathode resistance is made relatively large so that this value of cathode resistance is a dominating factor in providing a constant current flow in the cathode. Thus, since the sum of the two tube currents is a constant, a signal applied to the grid of one tube will always produce equal and opposite current changes in the two tubes. The application of signals to both grids produces in the plate output of each tube, a resultant amplified voltage which is proportional to the difference of the applied input signals, the output voltage appearing at each plate then being of equal amplitude but of opposite phase polarity. Finally, if the same signal is applied to both grids, no output signal results, as is understood.

In operation, as the optical system shown in FIG. 2 converges the incident rays of infrared radiation onto photoconductive cells 26 and 26', the resistance of these cells decreases to allow an increase of current to flow through load resistors 28 and 28', respectively, thereby allowing a greater positive voltage to be developed therein with respect to the cathode of the pre-amplifiers 29 and 29'. At this point, the operation of the instant ranging system can best be described with reference to the lower channel shown in FIGS. 4a and 4b, and it should be understood that the basic operation in either channel is the same with the exception that the upper channel contains a filter 25. Since the infrared radiation focused upon cell 26 is unfiltered, the spectral energy, instrumental to develop a proportional voltage variation across load resistor 28, will be greater than for the filtered radiation of the upper channel. This signal voltage is alternately interrupted by disc 16 of the synchronous choppers previously described to effectively convert the relatively static level of developed signal voltage indicative of received infrared radiation into a voltage waveform approximating a square wave. Thus, a purpose of the synchronous choppers is to allow the signal voltage to traverse through the coupling capacitors of the RC coupling network of the A.C. amplifiers used in the instant embodiment. The positive signal voltage appearing, therefore, across the cathode resistance 36 will reduce the quiescent plate current of pentode 37 by the increase of grid to cathode bias potential and an amplified version of the input signal of same phase polarity will be developed across the low Q broadly resonant plate load comprising inductance 42 and capacitor 43. The signal voltage is coupled through condenser 47 and appears across grid resistor 48 of a conventional pentode amplifier stage. In the plate output of tube 52 appears a negative going signal with an amplitude established as W, the value of the intensity of total unfiltered radiation. In the pentode stage employing tube 52', a similar signal appears in the plate output having an amplitude established as $W_F$, the value of the intensity of filtered radiation. Pentode 64 in a conventional amplifier stage inverts the signal and modifies the gain imparted the positive going output signal by the value of $W_{1F}$, the intensity of filtered radiation at unit distance from target. An exactly similar function is performed in the amplifier stage employing pentode 64', which inverts the signal of the upper channel and modifies the gain imparted the positive going output signal by the value $W_1$, the intensity of total unfiltered radiation at unit distance from target. Degenerative feedback controls 62 and 62' are coupled together in a manner so that over the full range of values of the thermal intensity ratio $$\frac{W_{1F}}{W_1}$$

the gain of these stages appropriately modifies the amplitude levels of the signal voltage represented by $W_F$ and W, in accordance with the associated constants $W_1$ and $W_{1F}$, respectively.

It is apparent that the signal proportional to $W_{1F}W$ developed across plate load resistor 69 is coupled through capacitor 71 and appears across grid load resistor 72 of stage 32 for further amplification prior to performing a comparison of the respective signal voltages of the upper and lower channels. A positive voltage proportional to the infrared radiation of the unfiltered spectrum is impressed on the grid input of triode 75. Thus, an amplified signal of negative polarity, representing the quantity $W_{1F}W$, is developed across plate load resistance 77. Similarly in the upper channel, an amplified signal of the same phase representing the quantity $W_1 W_F$ is produced in the plate output of triode 75'.

It is important to note that in the circuit operation discussed thus far, a singular significant diversity exists: The respective signals of both channels though identical in phase relationship, differ in their relative magnitudes. The signal voltage representing the quantity $W_{1F}W$ of the lower channel will be of larger negative magnitude, because the spectral energy for the unfiltered infrared radiation is greater. Thus, in the input circuits of triodes 81 and 81' of comparison amplifier 33 are impressed respective negative signal potentials of unequal magnitudes. Because of the constant current characteristic of comparison amplifier 33, the resultant difference of the respective signal potentials appearing across grid resistors 79 and 79' will be of positive polarity across load resistor 86 and of negative polarity across load resistor 86'. A push-pull signal is thus observed to be developed in the output that is mathematically representative of the quantity $W_{1F}W - W_1 W_F$. The value of this quantity is indicative of the distance to an infrared radiating target. It will be observed that at unit target distance at which there is no selective absorption of the spectrum, the value assumed by this expression is some arbitrary constant greater than zero. At maximum ranges wherein the absorption is a dominant factor, the value of $W_{1F}W - W_1 W_F$ progressively diminishes, approaching zero. Therefore, the range indication is observed to be inversely proportional to the magnitude of the push-pull output signal of stage 33.

The magnitude of signal voltage represented by the above expression is necessarily modified in conformance with the constant $$K = \frac{1}{\alpha_F - \alpha}$$

by control of the gain of the comparison amplifier through degenerative cathode feedback. The atmospheric attenuation calibration control 84 is preset in accordance with contemplated flight operating conditions, and is instrumental to control the gain G of stage 33 by virtue of the term appearing in the denominator of the expression for the modified gain, $$G' = \frac{G}{(\mu + 1) R_{84}}$$

where $\mu$ is the amplification factor of like tubes 81 and 81', and $R_{84}$ is the preset value of resistance of the atmospheric attenuation calibration control, Thus, the RMS type of meter 34 will read the push-pull difference voltage, represented in FIG. 4b by the expression $W_{1F}W - W_1W_F$ for ultimate determination of range. The meter may be calibrated into units of miles or yards, depending upon tactical operational considerates of the instant infrared ranging system.

Thus, the instant invention presents a passive type of apparatus for determining the range of an object whose thermal intensity characteristics are known. The inventive principle upon which the instant embodiment is based makes use of the discovery that there is preferential absorption of the infrared radiation by the atmosphere in some spectral bands more than in other spectral bands. Accordingly, the instant invention incorporates spectral discrimination apparatus which includes a dual optical system for converging the rays of infrared radiation upon respective photoconductive cells. One of the cells receives the filtered radiation of the spectral bands in which there is little absorption; the other cell receives the total unfiltered radiation of the infrared spectrum. Dual electronic circuits are provided for amplification of the respective signals of each channel, and a comparison of these signals is made for ultimate determination of range, which is indicated on a meter calibrated in arbitrary units. Calibration controls are provided for modifying the signal potentials in accordance with both the thermal intensity ratio of an infrared radiating source and the atmospheric attenuation constants applicable for the particular flight operating conditions.

The preferred embodiment shown is merely illustrative. Many variations of the apparatus herein disclosed will readily occur to one skilled in the art. For example, the arrangement of synchronous choppers used in the illustrative embodiment of the instant invention is but a simple expedient for enabling the use of A.C. amplifiers. An alternate electronic means for performing this chopping function incorporates the use of a square wave generator whose voltage output may be applied in phase to the suppressor grid of the pre-amplifier stage of both channels. Further, it is obvious to one skilled in the art that the chopping means may be eliminated altogether by the use of properly designed D.C. amplifiers. In addition, though a comparison of respective channel signals is made in the instant embodiment by utilizing a modified form of a difference amplifier, it should be understood that other techniques for performing the comparison, such as for example, the use of a ratio detector or conventional analog computer components, do not detract from the inventive principle as herein set forth.

Obviously many modifications and variations of the present invention are possible in the light of the above teachings. It is, therefore, to be understood that within the scope of the appended claims, the invention may be practiced otherwise than as specifically described.

What is claimed is:

1. Apparatus for determining the range of an infrared radiating body comprising a detector to detect the complete infrared spectrum of radiations from the infrared radiating body, means to detect infrared radiations comprising selected bands of wavelengths of infrared radiations from the radiating body, means to compare intensity of the detected complete infrared spectrum of radiations from the radiating body with the intensity of the selected bands of wavelengths of infrared radiations from the radiating body, and means to display the compared radiations in terms of target range.

2. Apparatus for determining range of an infrared radiating body comprising a first detector sensitive to a continuous band of infrared radiation from the infrared radiating body, an additional detector, means to selectively pass desired bands of frequencies of infrared radiation to said additional detector, first means coupled to first detector operative to provide a signal proportional to said first continuous band of infrared radiation, second means coupled to said second detector operative to provide a signal proportional to said selected band of infrared radiation, means coupled to said first and second means operative to provide a signal proportional to the comparative values of the signals therefrom, and range indicating means coupled to said last mentioned means.

3. Apparatus determining the range of a target comprising an optical radiation receiving means including a pair of synchronous choppers for interrupting the total infrared radiation received from said target, a first channel means containing a first photoconductive cell arranged in a series circuit to produce a signal voltage proportional to the total infrared radiation incident upon said cell and including a plurality of amplifier stages for amplification of said signal voltage, a filter for selectively passing bands of infrared radiation having low associated atmospheric attenuation constants, a second channel means containing a second photoconductive cell, screened by said filter, arranged in a series circuit to produce a signal voltage proportional to the filtered bands of infrared radiation incident upon said second cell, and including a plurality of amplifier stages for amplification of said latter signal voltage, a comparison amplifier connected to said first and second channels for performing a comparison of the amplified signal voltage proportional to total infrared radiation with amplified signal voltage proportional to the filtered infrared radiation, and a distance indication means connected to the output of the comparison amplifier to receive a resultant signal voltage indicative of the range of said target emitting infrared radiation.

References Cited in the file of this patent

UNITED STATES PATENTS

| | | |
|---|---|---|
| 1,963,185 | Wilson | June 19, 1934 |
| 2,237,713 | Russell | Apr. 8, 1941 |
| 2,489,223 | Herbold | Nov. 22, 1949 |
| 2,490,011 | Bird | Dec. 6, 1949 |
| 2,794,926 | Watts et al. | June 4, 1957 |
| 2,800,023 | Obermaier | July 23, 1957 |

FOREIGN PATENTS

| | | |
|---|---|---|
| 671,369 | Great Britain | May 7, 1952 |